US012567745B2

(12) United States Patent
Ma et al.

(10) Patent No.: US 12,567,745 B2
(45) Date of Patent: Mar. 3, 2026

(54) METHOD AND SYSTEM FOR VERIFYING LOW-FREQUENCY OSCILLATION DAMPING CONTROL EFFECT OF GPSS

(71) Applicant: Guizhou Power Grid Co., Ltd., Guiyang (CN)

(72) Inventors: Qinfeng Ma, Guiyang (CN); Su An, Guiyang (CN); Junqiu Fan, Guiyang (CN); Mingshun Liu, Guiyang (CN); Lingzi Zhu, Guiyang (CN); Huaying Su, Guiyang (CN); Gang Yao, Guiyang (CN); Sheng Chen, Guiyang (CN); Zhibang Wang, Guiyang (CN); Zhongrun Xie, Guiyang (CN); Qingxin Pu, Guiyang (CN); Yixin Chen, Guiyang (CN); Chuanmei Zhou, Guiyang (CN); Jie Cao, Guiyang (CN); Qingqing Zhang, Guiyang (CN); Guosong Wang, Guiyang (CN); Xiang Fan, Guiyang (CN)

(*) Notice: Subject to any disclaimer, the term of this patent is extended or adjusted under 35 U.S.C. 154(b) by 0 days.

(21) Appl. No.: 19/008,112

(22) Filed: Jan. 2, 2025

(65) Prior Publication Data

US 2026/0024993 A1    Jan. 22, 2026

(30) Foreign Application Priority Data

Jul. 18, 2024    (CN) .......................... 202410965994.4

(51) Int. Cl.
| | |
|---|---|
| *H02J 3/24* | (2006.01) |
| *H02J 3/00* | (2006.01) |
| *H02J 3/001* | (2026.01) |

(52) U.S. Cl.
CPC ................ *H02J 3/24* (2013.01); *H02J 3/001* (2020.01); *H02J 2203/20* (2020.01)

(58) Field of Classification Search
CPC ........ H02J 3/12; H02J 3/1878; H02J 2203/20; H02J 3/24; H02J 3/001; G06Q 50/06
USPC ......................................................... 307/102
See application file for complete search history.

(56) References Cited

U.S. PATENT DOCUMENTS

| | | | |
|---|---|---|---|
| 2020/0041548 A1* | 2/2020 | Deng ........................ | H02J 3/00 |
| 2024/0030722 A1* | 1/2024 | Yamanaka ................ | H02J 7/34 |
| 2025/0062622 A1* | 2/2025 | Myers ..................... | H02J 3/381 |
| 2025/0202240 A1* | 6/2025 | Orus ............. | G06Q 10/063116 |

* cited by examiner

*Primary Examiner* — Daniel Cavallari
*Assistant Examiner* — Swarna N Chowdhuri

(57) ABSTRACT

Disclosed are a method and system for verifying a low-frequency oscillation damping control effect of a governor power system stabilizer (GPSS), relating to the technical field of power systems. The method includes: selecting a wiring working condition for a fault-free disconnection test, and constructing a unit test working condition; performing the fault-free disconnection test on an outgoing line of a power plant, and collecting an electromagnetic power fluctuation recording curve; and comparing low-frequency oscillation damping effects under different GPSS settings, evaluating the effects, and performing a cyclic test. A success rate of the test is increased, safety of the test is improved, and the overall stability and anti-oscillation capacity of the system are improved in the disclosure.

9 Claims, 6 Drawing Sheets

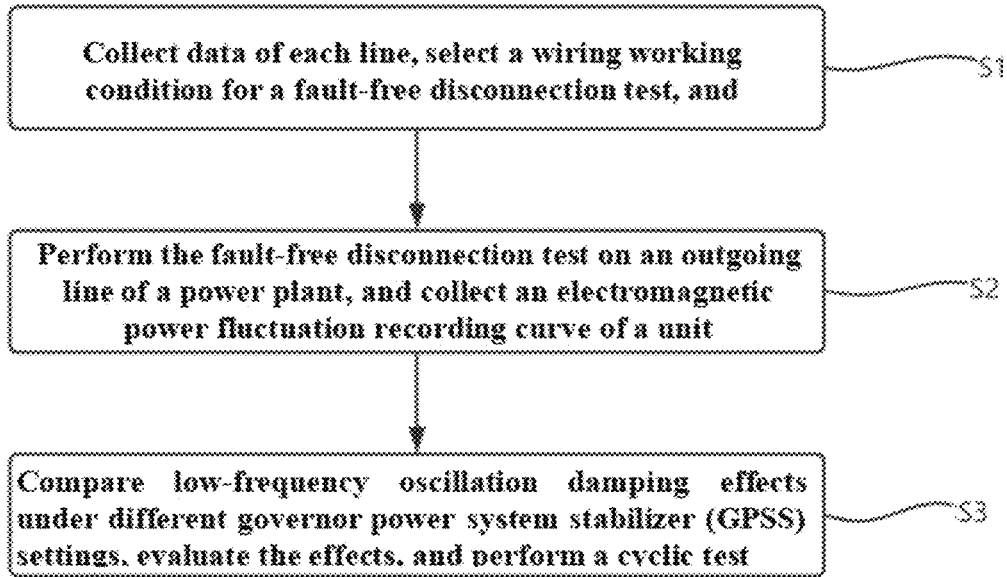

Collect data of each line, select a wiring working
condition for a fault-free disconnection test, and ⟶ S1

Perform the fault-free disconnection test on an outgoing
line of a power plant, and collect an electromagnetic
power fluctuation recording curve of a unit ⟶ S2

Compare low-frequency oscillation damping effects
under different governor power system stabilizer (GPSS)
settings, evaluate the effects, and perform a cyclic test ⟶ S3

Fig. 1

METHOD AND SYSTEM FOR VERIFYING LOW-FREQUENCY OSCILLATION DAMPING CONTROL EFFECT OF GPSS

CROSS-REFERENCE TO RELATED APPLICATIONS

The present application claims priority to Chinese Patent Application No. 2024109659944, filed on Jul. 18, 2024, the entire disclosure of which is incorporated herein by reference.

TECHNICAL FIELD

The disclosure relates to the technical field of power systems, and in particular to a method for verifying a low-frequency oscillation damping control effect of a governor power system stabilizer (GPSS).

BACKGROUND

With development of a power system increasingly-higher requirements on stability of a power grid, suppression of a low-frequency oscillation (LFO) has become an important topic in research of stability of the power system. The low-frequency oscillation, a type of periodic electromagnetic oscillation phenomenon caused by disturbances inside or outside a system, often occurs between 0.1 Hz and 2.0 Hz. A conventional method for suppressing a low-frequency oscillation mainly relies on a power system stabilizer (PSS, also referred to as an excitation power system stabilizer (EPSS)). The PSS can effectively improve damping characteristics of the system and reduce an oscillation amplitude by introducing a supplementary damping control signal into an excitation control system of a generator. However, in consideration of a complicated structure of the power grid and an increase in large-scale new energy grid connection, an oscillation suppression effect of relying solely on the PSS gradually exposes its limitations. Thus, researchers begin to introduce a governor power system stabilizer (GPSS) on a speed governing system side of the generator. The feasibility and superiority of the GPSS in multi-machine systems are demonstrated by means of theoretical research and simulation analysis. However, although the GPSS is remarkably superior in improvement of stability against small and large disturbances of the multi-machine systems, its practical application still remains in a simulation stage, lacking large-scale field tests and application verification.

Although some progress has been made in suppressing the low-frequency oscillation, various deficiencies still exist in the prior art. Firstly, owing to the dependence on an excitation system of the generator in a case of suppressing the low-frequency oscillation, except for a strong interconnection system, the PSS has a limited effect in a weak interconnection system and a high-proportion new energy system, and thus can hardly cope with the oscillation in a complex power grid environment. Secondly, most existing GPSS researches are concentrated on theory and simulation levels, lacking systematic field verification methods, so that it is difficult to assess the practical effect and reliability. In addition, an existing oscillation suppression control strategy generally lacks comprehensive consideration of overall performance of the system, and thus fails to make full use of the coordinated control capacity between units, so that the stability and response speed of the system under complex working conditions are still to be enhanced.

SUMMARY

In view of the above problems, the disclosure is provided. Thus, the technical problems to be solved by the disclosure are that an existing method for verifying a low-frequency oscillation damping control effect has large limitations, and lacks systematic verification, comprehensive consideration of overall performance of a system, and optimization of how to systematically verify an oscillation suppression effect of a governor power system stabilizer (GPSS).

In order to solve the above technical problems, the disclosure provides the technical solution as follows: a method for verifying a low-frequency oscillation damping control effect of a GPSS includes selecting a wiring working condition for a fault-free disconnection test, and constructing a unit test working condition; performing the fault-free disconnection test on an outgoing line of a power plant, and collecting an electromagnetic power fluctuation recording curve of a unit; and comparing low-frequency oscillation damping effects under different GPSS settings, evaluating the effects, and performing a cyclic test.

As a preferred solution of the method for verifying a low-frequency oscillation damping control effect of a GPSS of the disclosure, the selecting a wiring working condition for a fault-free disconnection test includes determining equivalent impedance, and analyzing stability of a system; where equivalent impedance of a plurality of lines is calculated, an influence of impedance and reactance of the lines on the system is comprehensively evaluated, resistance and the reactance of all the lines are summed, the equivalent impedance is calculated through weighted averaging in combination with apparent power of the lines, a fine adjustment parameter is introduced, and a sign of power of each line is corrected; the equivalent impedance is expressed as:

$$Z_{eq} = \frac{\sum_{i=1}^{n}\left(\frac{1}{R_i + jX_i}\right)}{\left|\sum_{i=1}^{n} S_i\right|} + \epsilon \cdot \text{sign}\left(\sum_{i=1}^{n} P_i\right)$$

$Z_{eq}$ denotes the equivalent impedance of the system, $R_i$ denotes resistance of an ith line, $X_i$ denotes reactance of the ith line, $S_i$ denotes apparent power of the ith line, $\epsilon$ denotes the fine adjustment parameter, sign denotes a sign function, and $P_i$ denotes power of the ith line; the stability of the system is analyzed, the stability of the system is measured on the basis of a real part of an eigenvalue of the system, and the smaller the real part of the eigenvalue is, the higher the stability of the system is; and an eigenvalue of a system matrix is solved, and a minimum value of the real part is taken as a system stability index, which is expressed as:

$$\lambda_{sys} = \min(\text{Re}(\lambda_i))$$

$\lambda_{sys}$ denotes the eigenvalue of the system, $\lambda_i$ denotes an ith eigenvalue, and Re denotes the real part.

As a preferred solution of the method for verifying a low-frequency oscillation damping control effect of a GPSS of the disclosure, the constructing a unit test working condition includes configuring outputs of the units; where a total output of all the units is calculated based on a base output of each unit, a dynamic adjustment factor is introduced, and an output fluctuation of the units in practical operation is simulated, which is expressed as:

$$P_{total} = \sum_{j=1}^{m} \left( P_{j, base} \cdot \left( 1 + \frac{A_j \cdot \sin(\omega t + \phi_j)}{100} \right) \right)$$

$P_{total}$ denotes the total output of all the units, $P_{j,base}$ denotes a base output of a jth unit, $A_j$ denotes an amplitude of an output fluctuation of the jth unit, $\omega$ denotes an angular frequency, $\phi_j$ denotes a phase of the jth unit, m denotes a number of the units, and t denotes a time; and based on sensitivity of each unit to a control parameter and an influence of the equivalent impedance of the system on the total output, a control parameter setting is obtained by minimizing a derivative square sum of the output of each unit to the control parameter in combination with a derivative square sum of the equivalent impedance to the total output, which is expressed as:

$$K_{opt} = \underset{K}{\arg\min} \left( \sum_{j=1}^{m} \left( \frac{\partial P_j}{\partial K} \right)^2 + Z_{eq} \cdot \left( \frac{\partial P_{total}}{\partial K} \right)^2 \right)$$

$K_{opt}$ denotes the control parameter.

As a preferred solution of the method for verifying a low-frequency oscillation damping control effect of a GPSS of the disclosure, the performing a test on fault-free disconnection of an outgoing line of a power plant includes evaluating an electromagnetic power fluctuation degree; where a power fluctuation in a case of disconnection is simulated based on the total output and in combination with the dynamic adjustment factor, an amplitude of the power fluctuation is dynamically adjusted in combination with the eigenvalue of the system during a simulation of the power fluctuation, and a response characteristic of the system in the case of the disconnection is reflected; the fluctuation degree is quantified by calculating a variance of the power fluctuation, and the greater the variance is, the severer the power fluctuation is, and the worse the stability of the system is; and a variance of power fluctuation within an entire period is calculated on the basis of an integration, and stability of the system in the case of the disconnection is evaluated, which is expressed as:

$$P(t) = P_{total} \left( 1 + k \cdot e^{-\alpha t} \cdot \sin(\beta t + \gamma) + \xi \cdot \cos(\lambda t^2) + \frac{\lambda_{sys}}{1 + e^{-\eta t}} \right)$$

$$\sigma_P^2 = \frac{1}{T} \int_0^T (P(t) - \overline{P})^2 dt$$

P(t) denotes power at a time t, k denotes an attenuation coefficient, $\alpha$ denotes an exponential attenuation constant, $\beta$ denotes a fluctuation frequency, $\gamma$ denotes a phase angle, $\xi$ denotes a correction coefficient, $\lambda$ denotes a nonlinear coefficient, $\eta$ denotes a time constant, $$\sigma_P^2$$

denotes the variance of the power fluctuation, T denotes the period, and $\overline{P}$ denotes average power.

As a preferred solution of the method for verifying a low-frequency oscillation damping control effect of a GPSS of the disclosure, the collecting an electromagnetic power fluctuation recording curve of a unit includes analyzing the response characteristic of the system; where a root mean square voltage is calculated, a voltage fluctuation condition of the system within the entire period is acquired, a power fluctuation curve is simulated in combination with a sine function and a smoothing parameter, the variance of the power fluctuation is corrected, and the power fluctuation of the system in the case of the disconnection is reflected, which is expressed as:

$$V_{rms} = \sqrt{\frac{1}{T} \int_0^T v(t)^2 dt + \sigma \cdot \int_0^T \left| \frac{dv(t)}{dt} \right| dt}$$

$$\Delta P(t) = P_{total} \left( \frac{\sin(\omega t)}{1 + \exp(-\theta(t - T/2))} + \frac{\sigma_P^2}{1 + e^{-\kappa t}} \right)$$

$V_{rms}$ denotes the root mean square voltage, v(t) denotes a voltage at a time t, $\sigma$ denotes a weighting coefficient, $\Delta P(t)$ denotes a power fluctuation at the time t, $\theta$ denotes the smoothing parameter, and $\kappa$ denotes a time constant.

As a preferred solution of the method for verifying a low-frequency oscillation damping control effect of a GPSS of the disclosure, the comparing low-frequency oscillation damping effects under different GPSS settings includes calculating a damping ratio; where damping effects of the system under different control parameters are quantified, a frequency offset is calculated in combination with an initial frequency offset, a natural frequency of the system, a damping oscillation frequency, and correction of the power fluctuation curve, and response characteristics of the system under different control parameters are reflected by dynamically adjusting the frequency offset, which is expressed as:

$$\zeta = \frac{c}{2\sqrt{m_1 k_1}} + \delta \cdot \int_0^\infty e^{-\rho t} |\sin(\theta t)| dt + \frac{V_{rms}}{1 + e^{-\mu t}}$$

$$\Delta f(t) = \Delta f_0 \cdot e^{-\zeta \omega_n t} \cdot \left( \cos(\omega_d t) + \frac{\zeta \omega_n}{\omega_d} \sin(\omega_d t) \right) + \frac{\Delta P(t)}{1 + e^{-\nu t}}$$

$\zeta$ denotes the damping ratio, c denotes a damping coefficient, $m_1$ denotes mass, $k_1$ denotes stiffness, $\delta$ denotes an integration coefficient, $\rho$ denotes a time attenuation coefficient, $\Delta f(t)$ denotes a frequency offset at the time t, $\Delta f_0$ denotes the initial frequency offset, $\omega_n$ denotes the natural frequency of the system, $\omega_d$ denotes the damping oscillation frequency, u denotes a time constant, and v denotes an attenuation factor.

As a preferred solution of the method for verifying a low-frequency oscillation damping control effect of a GPSS of the disclosure, the evaluating the effects, and performing a cyclic test include optimizing the control parameter; where a damping ratio variation amount is calculated by comparing a new damping ratio with an old damping ratio, the new damping ratio is calculated according to latest test data, the old damping ratio is a base value before optimization, the damping ratio variation amount reflects an influence of the GPSS on the stability of the system under a current configuration, in a case that the variation amount is positive and greater than a threshold, it is indicated that a damping enhancement effect of the GPSS is effective, the test is ended, and in a case that the variation amount is negative or less than a threshold, a lead-lag parameter of the stabilizer is optimized, and the test is repeated, which is expressed as:

$$\Delta\zeta = \zeta_n - \zeta_0$$

$$\text{If } \Delta\zeta < \zeta_t \text{ then } \tau'_{lead-lag} = \tau_{lead-lag}\left(1 + \frac{d\zeta}{d\tau_{lead-lag}} \cdot \Delta\tau_{lead-lag}\right)$$

$\Delta\zeta$ denotes the damping ratio variation amount, $\zeta_n$ denotes the new damping ratio, $\zeta_o$ denotes the old damping ratio, $\zeta_t$ denotes a damping enhancement effect threshold, $$\tau'_{lead-lag}$$

denotes an adjusted lead-lag time constant, $\tau_{lead-lag}$ denotes an original lead-lag time constant, $d\tau_{lead-lag}$ denotes a derivative of the damping ratio to the lead-lag time constant, and $\Delta\tau_{lead-lag}$ denotes a lead-lag time constant variation amount.

Another objective of the disclosure is to provide a system for verifying a low-frequency oscillation damping control effect of a GPSS. Accordingly, a fault-free disconnection test is performed on an outgoing line of a power plant through a test collection module, an electromagnetic power fluctuation recording curve of a unit is systematically collected, and thus the problem that it is difficult to quantify a system response at present is solved.

As a preferred solution of the system for verifying a low-frequency oscillation damping control effect of a GPSS of the disclosure, the system includes a test working condition module, a test collection module, and a comparison and evaluation module; where the test working condition module is configured to select a wiring working condition for a fault-free disconnection test, and construct a unit test working condition; the test collection module is configured to perform the fault-free disconnection test on an outgoing line of a power plant, and collect an electromagnetic power fluctuation recording curve of a unit; and the comparison and evaluation module is configured to compare low-frequency oscillation damping effects under different GPSS settings, evaluate the effects, and perform a cyclic test.

A computer apparatus is further provided. The computer apparatus includes a memory and a processor, where the memory stores a computer program, and the processor implements steps of the method for verifying a low-frequency oscillation damping control effect of a GPSS when executing the computer program.

A computer-readable storage medium is further provided. The computer-readable storage medium stores a computer program, where the computer program implements steps of the method for verifying a low-frequency oscillation damping control effect of a GPSS when executed by a processor.

The disclosure has the beneficial effects as follows: according to the method for verifying a low-frequency oscillation damping control effect of a GPSS provided by the disclosure, by optimizing the wiring working condition, possible risks in a practical test are reduced, a success rate of the test is increased, and safety of the test is improved; by calculating the total output of all the units, representativeness of the test is enhanced, and the stability and an anti-oscillation capacity of the system are improved; by calculating the damping ratio and the frequency offset of the system, the stability of the system under different GPSS settings is evaluated in detail, and the overall stability and anti-oscillation capacity of the system are improved; and by optimizing the control parameter, and dynamically adjusting a control gain, the stability of the system is improved, and a response speed of the system is increased. The disclosure has more desirable effects in safety, success rate, and anti-oscillation capacity.

BRIEF DESCRIPTION OF DRAWINGS

In order to describe the technical solution in examples of the disclosure more clearly, a brief description of the accompanying drawings required for describing the examples will be provided below. Obviously, the accompanying drawings in the following description show merely some examples of the disclosure. Those of ordinary skill in the art can also derive other accompanying drawings from these accompanying drawings without creative efforts. Specifically:

FIG. 1 is an overall flowchart of a method for verifying a low-frequency oscillation damping control effect of a governor power system stabilizer (GPSS) according to a first example of the disclosure;

DETAILED DESCRIPTION OF THE EMBODIMENTS

Figure 2:
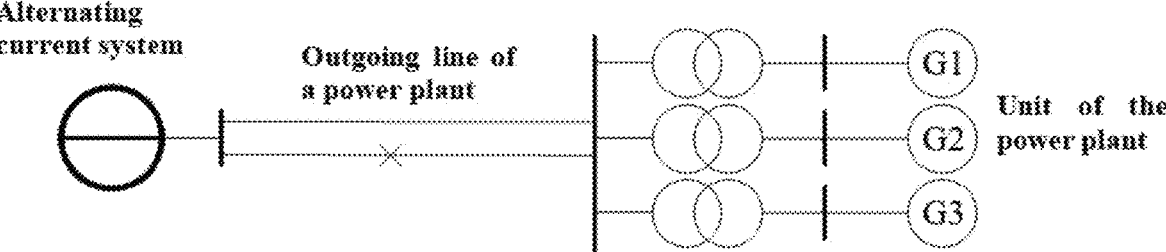
FIG. 2 is a schematic diagram of a wiring working condition for a fault-free disconnection test of a method for verifying a low-frequency oscillation damping control effect of a GPSS according to a second example of the disclosure.

In order to make the above objectives, features, and advantages of the disclosure clearer and more understandable, particular embodiments of the disclosure will be described in detail below in conjunction with the drawings of the description. Apparently, examples described are some examples rather than all examples of the disclosure. Based on the examples of the disclosure, all other examples derived by those of ordinary skill in the art without creative efforts fall within the scope of protection of the disclosure.

Example 1

With reference to FIG. 1, a method for verifying a low-frequency oscillation damping control effect of a governor power system stabilizer (GPSS) according to an example of the disclosure is shown. The method includes:

S1: a wiring working condition for a fault-free discon-
nection test is selected, and a unit test working condition is
constructed.

More further, the step that a wiring working condition for
a fault-free disconnection test is selected includes equivalent
i impedance is determined, and stability of a system is
analyzed.

It should be noted that equivalent impedance of a plurality
of lines is calculated, an influence of impedance and reac-
tance of the lines on the system is comprehensively evalu-
ated, resistance and the reactance of all the lines are
summed, the equivalent impedance is calculated through
weighted averaging in combination with apparent power of
the lines, a fine adjustment parameter is introduced, and a
sign of power of each line is corrected; the equivalent
impedance is expressed as:

$$Z_{eq} = \frac{\sum_{i=1}^{n}\left(\frac{1}{R_i + jX_i}\right)}{\left|\sum_{i=1}^{n}S_i\right|} + \epsilon \cdot \text{sign}\left(\sum_{i=1}^{n}P_i\right)$$

$Z_{eq}$ denotes the equivalent impedance of the system, $R_i$
denotes resistance of an ith line, $X_i$ denotes reactance of the
ith line, $S_i$ denotes apparent power of the ith line, $\epsilon$ denotes
the fine adjustment parameter, sign denotes a sign function,
and $P_i$ denotes power of the ith line; the stability of the
system is analyzed, the stability of the system is measured
on the basis of a real part of an eigenvalue of the system, and
the smaller the real part of the eigenvalue is, the higher the
stability of the system is; and an eigenvalue of a system
matrix is solved, and a minimum value of the real part is
taken as a system stability index, which is expressed as:

$$\lambda_{sys} = \min(\text{Re}(\lambda_i))$$

$\lambda_{sys}$ denotes the eigenvalue of the system, $\lambda_i$ denotes an ith
eigenvalue, and Re denotes the real part.

More further, the step that a unit test working condition is
constructed includes outputs of the units are configured.

It should be noted that a total output of all the units is
calculated based on a base output of each unit, a dynamic
adjustment factor is introduced, and an output fluctuation of
the units in practical operation is simulated, which is
expressed as:

$$P_{total} = \sum_{j=1}^{m}\left(P_{j,base} \cdot \left(1 + \frac{A_j \cdot \sin(\omega t + \phi_j)}{100}\right)\right)$$

$P_{total}$ denotes the total output of all the units, $P_{j,base}$
denotes a base output of a jth unit, $A_j$ denotes an amplitude
of an output fluctuation of the jth unit, $\omega$ denotes an angular
frequency, $\phi_j$ denotes a phase of the jth unit, m denotes a
number of the units, and t denotes a time; and based on
sensitivity of each unit to a control parameter and an
influence of the equivalent impedance of the system on the
total output, a control parameter setting is obtained by
minimizing a derivative square sum of the output of each
unit to the control parameter in combination with a derivative square sum of the equivalent impedance to the
total output, which is expressed as:

$$K_{opt} = \arg\min_{K}\left(\sum_{j=1}^{m}\left(\frac{\partial P_j}{\partial K}\right)^2 + Z_{eq} \cdot \left(\frac{\partial P_{total}}{\partial K}\right)^2\right)$$

$K_{opt}$ denotes the control parameter.

S2: the fault-free disconnection test is performed on an
outgoing line of a power plant, and an electromagnetic
power fluctuation recording curve of a unit is collected.

More further, the step that the fault-free disconnection test
is performed on an outgoing line of a power plant includes
an electromagnetic power fluctuation degree is evaluated.

It should be noted that a power fluctuation in a case of
disconnection is simulated based on the total output and in
combination with the dynamic adjustment factor, an ampli-
tude of the power fluctuation is dynamically adjusted in
combination with the eigenvalue of the system during a
simulation of the power fluctuation, and a response charac-
teristic of the system in the case of the disconnection is
reflected; the fluctuation degree is quantified by calculating
a variance of the power fluctuation, and the greater the
variance is, the severer the power fluctuation is, and the
worse the stability of the system is; and a variance of power
fluctuation within an entire period is calculated on the basis
of an integration, and stability of the system in the case of
the disconnection is evaluated, which is expressed as:

$$P(t) = P_{total}\left(1 + k \cdot e^{-\alpha t} \cdot \sin(\beta t + \gamma) + \xi \cdot \cos(\lambda t^2) + \frac{\lambda_{sys}}{1 + e^{-\eta t}}\right)$$

$$\sigma_P^2 = \frac{1}{T}\int_0^T (P(t) - \bar{P})^2 dt$$

P(t) denotes power at a time t, k denotes an attenuation
coefficient, $\alpha$ denotes an exponential attenuation con-
stant, $\beta$ denotes a fluctuation frequency, $\gamma$ denotes a
phase angle, $\xi$ denotes a correction coefficient, $\lambda$
denotes a nonlinear coefficient, $\eta$ denotes a time con-
stant, $$\sigma_P^2$$

denotes the variance of the power fluctuation, T denotes the
period, and $\bar{P}$ denotes average power.

More further, the step that an electromagnetic power
fluctuation recording curve of a unit is collected includes a
response characteristic of the system is analyzed.

It should be noted that a root mean square voltage is
calculated, a voltage fluctuation condition of the system
within the entire period is acquired, a power fluctuation
curve is simulated in combination with a sine function and
a smoothing parameter, the variance of the power fluctuation
is corrected, and the power fluctuation of the system in the
case of the disconnection is reflected, which is expressed as:

$$V_{rms} = \sqrt{\frac{1}{T}\int_0^T v(t)^2 dt + \sigma \cdot \int_0^T \left|\frac{dv(t)}{dt}\right| dt}$$

$$\Delta P(t) = P_{total}\left(\frac{\sin(\omega t)}{1 + \exp(-\theta(t - T/2))} + \frac{\sigma_P^2}{1 + e^{-\kappa t}}\right)$$

$V_{rms}$ denotes the root mean square voltage, v(t) denotes a voltage at a time t, σ denotes a weighting coefficient, ΔP(t) denotes a power fluctuation at the time t, θ denotes the smoothing parameter, and κ denotes a time constant.

S3: low-frequency oscillation damping effects under different GPSS settings are compared, the effects are evaluated, and a cyclic test is performed.

More further, the step that low-frequency oscillation damping effects under different GPSS settings are compared includes a damping ratio is calculated.

It should be noted that damping effects of the system under different control parameters are quantified, a frequency offset is calculated in combination with an initial frequency offset, a natural frequency of the system, a damping oscillation frequency, and correction of the power fluctuation curve, and response characteristics of the system under different control parameters are reflected by dynamically adjusting the frequency offset, which is expressed as:

$$\zeta = \frac{c}{2\sqrt{m_1 k_1}} + \delta \cdot \int_0^\infty e^{-\rho t} |\sin(\theta t)| dt + \frac{V_{rms}}{1 + e^{-\mu t}}$$

$$\Delta f(t) = \Delta f_0 \cdot e^{-\zeta \omega_n t} \cdot \left( \cos(\omega_d t) + \frac{\zeta \omega_n}{\omega_d} \sin(\omega_{dt}) \right) + \frac{\Delta P(t)}{1 + e^{-vt}}$$

ζ denotes the damping ratio, c denotes a damping coefficient, $m_1$ denotes mass, $k_1$ denotes stiffness, δ denotes an integration coefficient, ρ denotes a time attenuation coefficient, Δf(t) denotes a frequency offset at the time t, $\Delta f_0$ denotes the initial frequency offset, $\omega_n$ denotes the natural frequency of the system, $\omega_d$ denotes the damping oscillation frequency, μ denotes a time constant, and v denotes an attenuation factor.

More further, the step that the effects are evaluated, and a cyclic test is performed includes the control parameter is optimized.

It should be noted that a damping ratio variation amount is calculated by comparing a new damping ratio with an old damping ratio, the new damping ratio is calculated according to latest test data, the old damping ratio is a base value before optimization, the damping ratio variation amount reflects an influence of the GPSS on the stability of the system under a current configuration, in a case that the variation amount is positive and greater than a threshold, it is indicated that a damping enhancement effect of the GPSS is effective, the test is ended, and in a case that the variation amount is negative or less than a threshold, a lead-lag parameter of the stabilizer is optimized, and the test is repeated, which is expressed as:

$$\Delta \zeta = \zeta_n - \zeta_o$$

$$\text{If } \Delta \zeta < \zeta_t \text{ then } \tau'_{lead-lag} = \tau_{lead-lag} \left( 1 + \frac{d\zeta}{d\tau_{lead-lag}} \cdot \Delta \tau_{lead-lag} \right)$$

Δζ denotes the damping ratio variation amount, $\zeta_n$ denotes the new damping ratio, $\zeta_o$ denotes the old damping ratio, $\zeta_t$ denotes a damping enhancement effect threshold, $$\tau'_{lead-lag}$$

denotes an adjusted lead-lag time constant, $\tau_{lead-lag}$ denotes an original lead-lag time constant, $d\tau_{lead-lag}$ denotes a derivative of the damping ratio to the lead-lag time constant, and $\Delta \tau_{lead-lag}$ denotes a lead-lag time constant variation amount.

Example 2

With reference to FIGS. 2-5, a method for verifying a low-frequency oscillation damping control effect of a GPSS according to an example of the disclosure is shown. In order to verify the beneficial effects of the disclosure, scientific demonstration is performed through simulation experiments.

Figure 3:
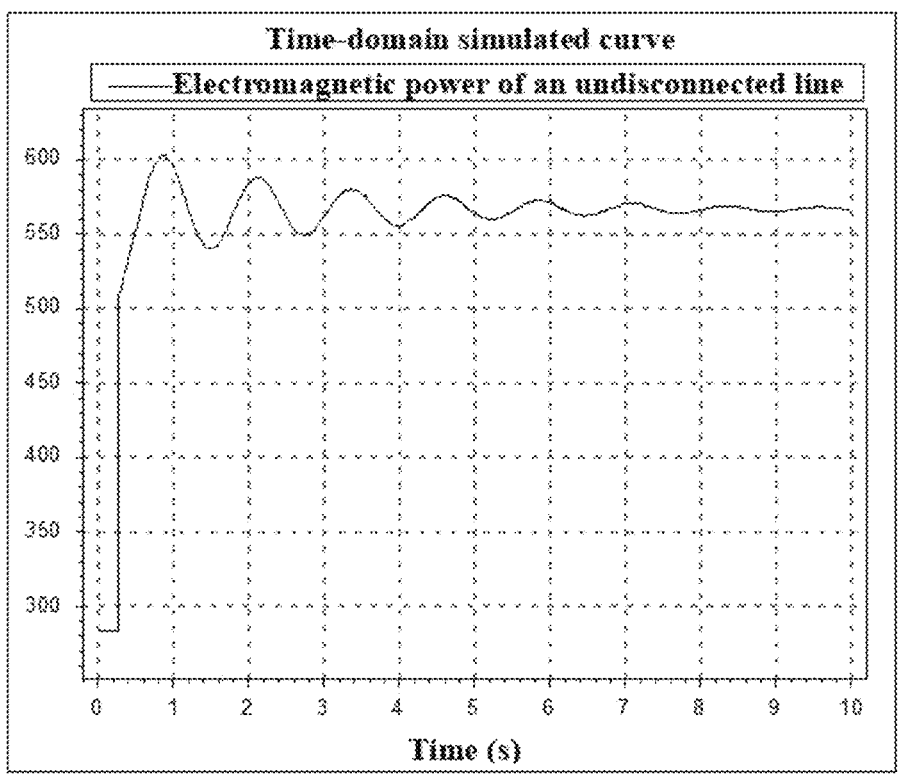
FIG. 3 shows a simulated electromagnetic power fluctuation curve of an undisconnected line after fault-free disconnection of an outgoing line of a power plant of the method for verifying a low-frequency oscillation damping control effect of a GPSS according to the second example of the disclosure.

The schematic diagram of th working condition selected in the example is shown in FIG. 2. There are 2 outgoing lines between the power plant and an alternating current system, 3 units are operated in the power plant, outputs of the 3 units in the power plant are kept consistent, and rated power is between 80% and 90%. Moreover, primary frequency modulation, single-unit automatic generation control (AGC), and single-unit automatic voltage control (AVC) are deactivated. A hardware device of the GPSS is mounted in a G3 unit, and an excitation power system stabilizer (EPSS) function is kept in an activated state. No hardware device of the GPSS is mounted in a G1 unit, and an EPSS function are in a deactivated state. No hardware device of the GPSS is mounted in a G2 unit, but an EPSS function is in an activated state. One outgoing line of the power plant is disconnected, and an electromagnetic power fluctuation condition of the other line is observed. A simulated electromagnetic power fluctuation curve of the undisconnected line is shown in FIG. 3. After fault-free disconnection of the outgoing line of the power plant, electromagnetic power fluctuation curves of different units are collected through a phasor measurement unit (PMU) or a recording device. Simulated electromagnetic power fluctuation curves of the 3 units are shown in FIG. 4.

Figure 4:
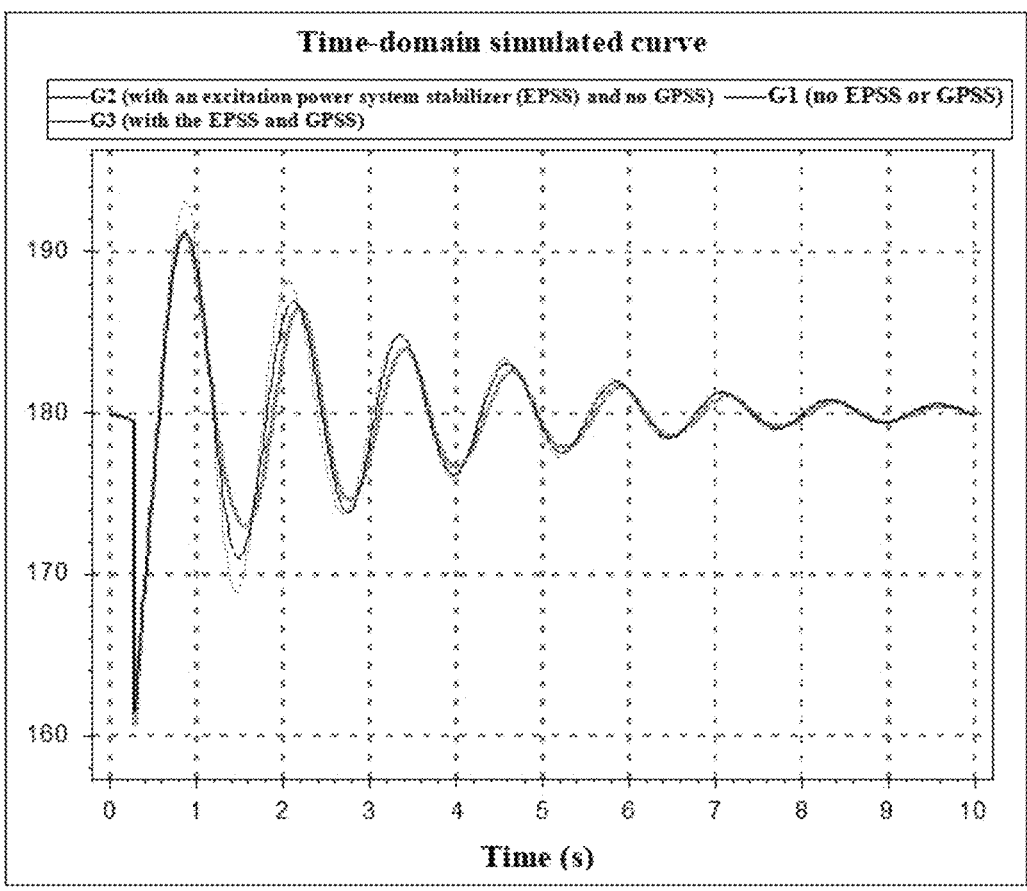
FIG. 4 shows simulated electromagnetic power fluctuation curves of different units after the fault-free disconnection of the outgoing line of a power plant of the method for verifying a low-frequency oscillation damping control effect of a GPSS according to the second example of the disclosure.
Figure 5:
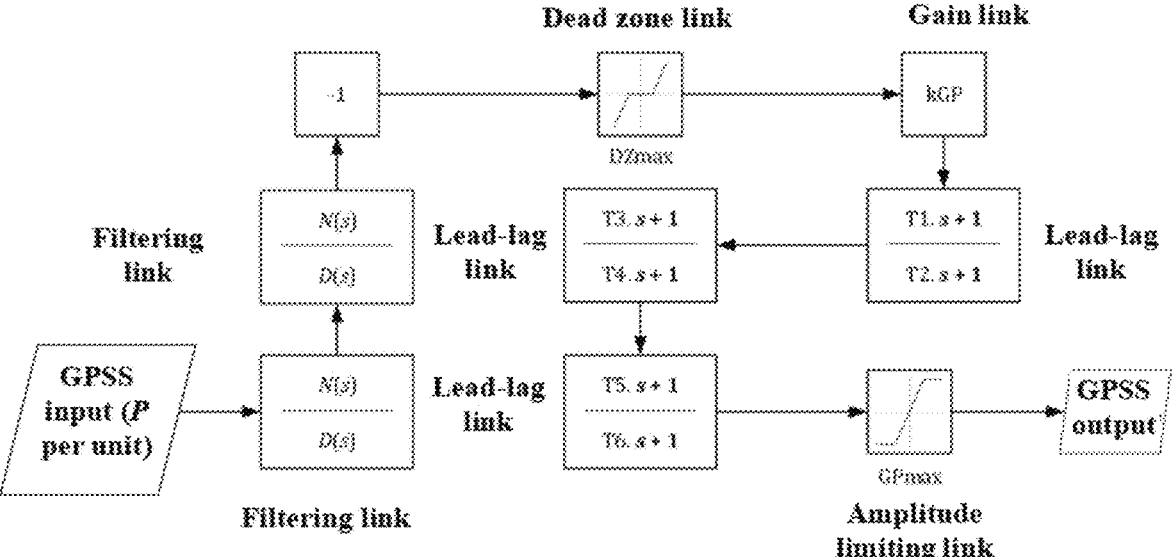
FIG. 5 shows a mathematic model a governor power system stabilizer of the method for verifying a low-frequency oscillation damping control effect of a GPSS according to the second example of the disclosure.

It can be seen from FIG. 4 that damping on a low-frequency oscillation of G2 with an EPSS is obviously enhanced compared with G1 without an EPSS, while damping on a low-frequency oscillation of G3 with the GPSS is further enhanced compared with G2. If a damping enhancement effect of the GPSS is not obvious, a lead-lag parameter in FIG. 5 is optimized, and the test is repeated until a damping enhancement requirement is satisfied.

Example 3

Figure 6:
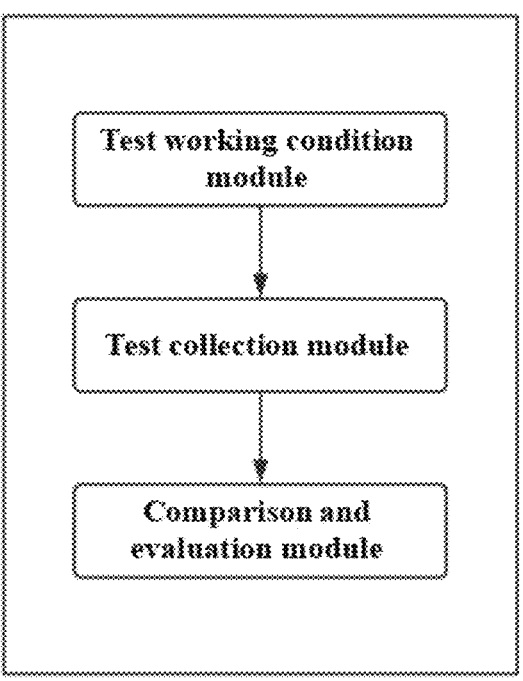
FIG. 6 is an overall module diagram of a system for verifying a low-frequency oscillation damping control effect of a GPSS according to a third example of the disclosure.

With reference to FIG. 6, a system for verifying a low-frequency oscillation damping control effect of a GPSS according to an example of the disclosure is shown. The system includes a test working condition module, a test collection module, and a comparison and evaluation module.

The test working condition module is configured to select a wiring working condition for a fault-free disconnection test, and construct a unit test working condition; the test collection module is configured to perform the fault-free disconnection test on an outgoing line of a power plant, and collect an electromagnetic power fluctuation recording curve of a unit; and the comparison and evaluation module is configured to compare low-frequency oscillation damping effects under different GPSS settings, evaluate the effects, and perform a cyclic test.

If implemented in a form of a software function unit and sold or used as an independent product, a function can be stored in a computer-readable storage medium. Based on such understanding, the technical solution of the disclosure in essence, the part that contributes to the prior art, or part of the technical solution can be embodied in a form of a software product. The computer software product is stored in a storage medium and includes several instructions configured to enable a computer apparatus (which can be a personal computer, a server, a network apparatus, etc.) to execute all or some of the steps of the method in each example of the disclosure. The foregoing storage medium includes various media capable of storing a program code, such as a universal serial bus (USB) flash disk, a mobile hard disk, a read-only memory (ROM), a random access memory (RAM), a magnetic disk, and an optical disk.

The logic and/or steps denoted in the flowcharts or described in other ways herein, for example, can be deemed as a sequenced list of executable instructions for implementing logical functions, and can be specifically implemented in any computer-readable medium for use by or in conjunction with an instruction execution system, device, and apparatus (such as a computer-based system, a system with a processor, and other systems that can fetch the instructions from the instruction execution system, device, and apparatus, and execute the instructions). In terms of the description, the "computer-readable medium" can be any device that can encompass, store, communicate with, propagate, or transmit a program for use by or in conjunction with the instruction execution system, device, or apparatus.

More specific instances of the computer-readable medium (non-exhaustively) include an electrical connection portion (an electronic device) having one or more wires, a portable computer disk cartridge (a magnetic device), a random access memory (RAM), a read-only memory (ROM), an erasable programmable read-only memory (EPROM) or a flash memory, an optical fiber device, a portable compact disk read-only memory (CD-ROM). In addition, the computer-readable medium can even be paper or another suitable medium on which the program can be printed given that the program can be obtained electronically, for example, by optically scanning the paper or another medium, and then performing editing, interpreting, or processing in another suitable way as necessary, and finally the program can be stored in a computer memory.

It should be understood that each part of the disclosure can be implemented through hardware, software, firmware, or their combinations. In the above embodiments, various steps or methods can be implemented through software or firmware stored in memory and executed by a suitable instruction execution system. For example, if implemented through hardware, as in another embodiment, various steps or methods can be implemented through any one or combinations of the following technologies known in the art: a discrete logic circuit having a logic gate circuit for implementing a logic function on a data signal, an application-specific integrated circuit having a suitable combinational logic gate circuit, a programmable gate array (PGA), a field programmable gate array (FPGA), etc. It should be noted that the above examples are merely used to explain the technical solution of the disclosure, and are not intended to limit the disclosure. Although the disclosure is described in detail with reference to the preferred examples, those of ordinary skill in the art should understand that they can make modifications or equivalent substitutions to the technical solution of the disclosure without departing from the spirit and scope of the technical solution of the disclosure. These modifications or equivalent substitutions should fall within the scope of the claims of the disclosure.

It should be noted that the above examples are merely used to explain the technical solution of the disclosure, and are not intended to limit the disclosure. Although the disclosure is described in detail with reference to the preferred examples, those of ordinary skill in the art should understand that they can make modifications or equivalent substitutions to the technical solution of the disclosure without departing from the spirit and scope of the technical solution of the disclosure. These modifications or equivalent substitutions should fall within the scope of the claims of the disclosure.

What is claimed is:

1. A method for verifying a low-frequency oscillation damping control effect of a governor power system stabilizer (GPSS), comprising: selecting a wiring working condition for a fault-free disconnection test, and constructing a unit test working condition; performing the fault-free disconnection test on an outgoing line of a power plant, and collecting an electromagnetic power fluctuation recording curve of a unit; and comparing low-frequency oscillation damping effects under different GPSS settings, evaluating the effects, and performing a cyclic test;

wherein the selecting a wiring working condition for a fault-free disconnection test comprises determining equivalent impedance, and analyzing stability of a system; wherein equivalent impedance of a plurality of lines is calculated, an influence of impedance and reactance of the lines on the system is comprehensively evaluated, resistance and the reactance of all the lines are summed, the equivalent impedance is calculated through weighted averaging in combination with apparent power of the lines, a fine adjustment parameter is introduced, and a sign of power of each line is corrected; the equivalent impedance is expressed as:

$$Z_{eq} = \frac{\sum_{i=1}^{n}\left(\frac{1}{R_i + jX_i}\right)}{\left|\sum_{i=1}^{n} S_i\right|} + \epsilon \cdot \text{sign}\left(\sum_{i=1}^{n} P_i\right)$$

$Z_{eq}$ denotes the equivalent impedance of the system, $R_i$ denotes resistance of an ith line, X denotes reactance of the ith line, S denotes apparent power of the ith line, e denotes the fine adjustment parameter, sign denotes a sign function, and $P_i$ denotes power of the ith line; the stability of the system is analyzed, the stability of the system is measured on the basis of a real part of an eigenvalue of the system, and the smaller the real part of the eigenvalue is, the higher the stability of the system is; and an I eigenvalue of a system matrix is solved, and a minimum value of the real part is taken as a system stability index, which is expressed as:

$$\lambda_{sys} = \min(\text{Re}(\lambda_i))$$

$\lambda_{sys}$ demotes the eigenvalue of the system $\lambda_i$ denotes an ith eigenvalue, and Re denotes the real part.

2. The method for verifying a low-frequency oscillation damping control effect of a GPSS according to claim 1, wherein the constructing a unit test working condition comprises configuring outputs of the units; wherein a total output of all the units is calculated based on a base output of each unit, a dynamic adjustment factor is introduced, and an output fluctuation of the units in practical operation is simulated, which is expressed as:

$$P_{total} = \sum_{j=1}^{m}\left(P_{j,base} \cdot \left(1 + \frac{A_j \cdot \sin(\omega t + \phi_j)}{100}\right)\right)$$

$P_{total}$ denotes the total output of all the units, $P_{j,base}$ denotes a base output of a jth unit, $A_j$ denotes an amplitude of an output fluctuation of the jth unit, $\omega$ denotes an angular frequency, $\phi_j$ denotes a phase of the jth unit, m denotes a number of the units, and t denotes a time; and based on sensitivity of each unit to a control parameter and an influence of the equivalent impedance of the system on the total output, a control parameter setting is obtained by minimizing a derivative square sum of the output of each unit to the control parameter in combination with a derivative square sum of the equivalent impedance to the total output, which is expressed as:

$$K_{opt} = \underset{K}{\arg\min}\left(\sum_{j=1}^{m}\left(\frac{\partial P_j}{\partial K}\right)^2 + Z_{eq} \cdot \left(\frac{\partial P_{total}}{\partial K}\right)^2\right)$$

$K_{opt}$ denotes the control parameter.

3. The method for verifying a low-frequency oscillation damping control effect of a GPSS according to claim 2, wherein the performing a test on fault-free disconnection of an outgoing line of a power plant comprises evaluating an electromagnetic power fluctuation degree; wherein a power fluctuation in a case of disconnection is simulated based on the total output and in combination with the dynamic adjustment factor, an amplitude of the power fluctuation is dynamically adjusted in combination with the eigenvalue of the system during a simulation of the power fluctuation, and a response characteristic of the system in the case of the disconnection is reflected; the fluctuation degree is quantified by calculating a variance of the power fluctuation, and the greater the variance is, the severer the power fluctuation is, and the worse the stability of the system is; and a variance of power fluctuation within an entire period is calculated on the basis of an integration, and stability of the system in the case of the disconnection is evaluated, which is expressed as:

$$P(t) = P_{total}\left(1 + k \cdot e^{-\alpha t} \cdot \sin(\beta t + \gamma) + \xi \cdot \cos(\lambda t^2) + \frac{\lambda}{1 + e^{\eta t}}\right)$$

$$sys\sigma_P^2 = \frac{1}{T}\int_0^T \left(P(t) - \overline{P}\right)^2 dt$$

P(t) denotes power at a time t, k denotes an attenuation coefficient, $\alpha$ denotes an exponential attenuation constant, $\beta$ denotes a fluctuation frequency, $\gamma$ denotes a phase angle, $\xi$ denotes a correction coefficient, $\lambda$ denotes a nonlinear coefficient, $\eta$ denotes a time constant, $$\sigma_P^2$$

denotes the variance of the power fluctuation, T denotes the period, and $\overline{P}$ denotes average power.

4. The method for verifying a low-frequency oscillation damping control effect of a GPSS according to claim 3, wherein the collecting an electromagnetic power fluctuation recording curve of a unit comprises analyzing the response characteristic of the system; wherein a root mean square voltage is calculated, a voltage fluctuation condition of the system within the entire period is acquired, a power fluctuation curve is simulated in combination with a sine function and a smoothing parameter, the variance of the power fluctuation is corrected, and the power fluctuation of the system in the case of the disconnection is reflected, which is expressed as:

$$V_{rms} = \sqrt{\frac{1}{T}\int_0^T v(t)^2 dt + \sigma \cdot \int_0^T \left|\frac{dv(t)}{dt}\right| dt}$$

$$\Delta P(t) = P_{total}\left(\frac{\sin(\omega t)}{1 + \exp\left(-\theta(t - T/2)\right)} + \frac{\sigma_P^2}{1 + e^{-\kappa t}}\right)$$

$V_{rms}$ denotes the root mean square voltage, v(t) denotes a voltage at a time t, $\sigma$ denotes a weighting coefficient, $\Delta P(t)$ denotes a power fluctuation at the time t, $\theta$ denotes the smoothing parameter, and $\kappa$ denotes a time constant.

5. The method for verifying a low-frequency oscillation damping control effect of a GPSS according to claim 4, wherein the comparing low-frequency oscillation damping effects under different GPSS settings comprises calculating a damping ratio; wherein damping effects of the system under different control parameters are quantified, a frequency offset is calculated in combination with an initial frequency offset, a natural frequency of the system, a damping oscillation frequency, and correction of the power fluctuation curve, and response characteristics of the system under different control parameters are reflected by dynamically adjusting the frequency offset, which is expressed as:

$$\zeta = \frac{c}{2\sqrt{m_1 k_1}} + \delta \cdot \int_0^\infty e^{-pt}|\sin(\theta t)|dt + \frac{V_{rms}}{1 + e^{-\mu t}}$$

$$\Delta f(t) = \Delta f_0 \cdot e^{-\zeta \omega_n t} \cdot \left(\cos(\omega_d t) + \frac{\zeta \omega_n}{\omega_d}\sin(\omega_d t)\right) + \frac{\Delta P(t)}{1 + e^{-vt}}$$

$\zeta$ denotes the damping ratio, c denotes a damping coefficient, $m_1$ denotes mass, $k_1$ denotes stiffness, $\delta$ denotes an integration coefficient, $\rho$ denotes a time attenuation coefficient, $\Delta f(t)$ denotes a frequency offset at the time t, $\Delta f_0$ denotes the initial frequency offset, $\omega_n$ denotes the natural frequency of the system, $\omega_d$ denotes the damping oscillation frequency, $\mu$ denotes a time constant, and v denotes an attenuation factor.

6. The method for verifying a low-frequency oscillation damping control effect of a GPSS according to claim 5, wherein the evaluating the effects, and performing a cyclic test comprise optimizing the control parameter; wherein a damping ratio variation amount is calculated by comparing a new damping ratio with an old damping ratio, the new damping ratio is calculated according to latest test data, the old damping ratio is a base value before optimization, the damping ratio variation amount reflects an influence of the GPSS on the stability of the system under a current configuration, in a case that the variation amount is positive and greater than a threshold, it is indicated that a damping enhancement effect of the GPSS is effective, the test is ended, and in a case that the variation amount is negative or less than a threshold, a lead-lag parameter of the stabilizer is optimized, and the test is repeated, which is expressed as:

$$\Delta\zeta = \zeta_n - \zeta_o$$

$$\text{If } \Delta\zeta < \zeta_t \text{ then } \tau'_{lead-lag} = \tau_{lead-lag}\left(1 + \frac{d\zeta}{d\tau_{lead-lag}} \cdot \Delta\tau_{lead-lag}\right)$$

$\Delta\zeta$ denotes the damping ratio variation amount, $\zeta_n$ denotes the new damping ratio, $\zeta_o$ denotes the old damping ratio, $\zeta_t$ denotes a damping enhancement effect threshold, $$\tau'_{lead-lag}$$

denotes an adjusted lead-lag time constant, $\tau_{lead-lag}$ denotes an original lead-lag time constant, $d\tau_{lead-lag}$ denotes a derivative of the damping ratio to the lead-lag time constant, and $\Delta\tau_{lead-lag}$ denotes a lead-lag time constant variation amount.

7. A system employing the method for verifying a low-frequency oscillation damping control effect of a GPSS according to claim 1, comprising a test working condition module, a test collection module, and a comparison and evaluation module; wherein the test working condition module is configured to select a wiring working condition for a fault-free disconnection test, and construct a unit test working condition;

the test collection module is configured to perform the fault-free disconnection test on an outgoing line of a power plant, and collect an electromagnetic power fluctuation recording curve of a unit; and the comparison and evaluation module is configured to compare low-frequency oscillation damping effects under different GPSS settings, evaluate the effects, and perform a cyclic test.

8. A computer apparatus, comprising a memory and a processor, wherein the memory stores a computer program, and the processor implements steps of the method for verifying a low-frequency oscillation damping control effect of a GPSS according to claim 1 when executing the computer program.

9. A computer-readable storage medium, storing a computer program, wherein the computer program implements steps of the method for verifying a low-frequency oscillation damping control effect of a GPSS according to claim 1 when executed by a processor.

* * * * *